United States Patent [19]

Teshigawara et al.

[11] Patent Number: 4,803,565
[45] Date of Patent: Feb. 7, 1989

[54] OPTICAL WRITE HEAD

[75] Inventors: Toru Teshigawara; Kazuo Terao, both of Kanagawa; Hiroshi Watanabe; Yukihiko Shimizu, both of Chiba, all of Japan

[73] Assignees: Fuji Xerox Co., Ltd., Tokyo; Futaba Corporation, Chiba, both of Japan

[21] Appl. No.: 226,548

[22] Filed: Jul. 29, 1988

Related U.S. Application Data

[63] Continuation of Ser. No. 897,829, Aug. 19, 1986, abandoned.

[30] Foreign Application Priority Data

Dec. 12, 1985 [JP] Japan .................. 60-278044

[51] Int. Cl.$^4$ ............................................. H04N 1/23
[52] U.S. Cl. ..................................... 358/300; 346/160
[58] Field of Search .............. 358/296, 298, 300, 75; 346/160, 108, 107 R

[56] References Cited

U.S. PATENT DOCUMENTS

| 3,624,661 | 11/1971 | Shebanow et al. | 346/155 |
| 4,357,625 | 11/1982 | Lamberts et al. | 358/75 |
| 4,524,372 | 6/1985 | De Cock et al. | 358/300 X |

FOREIGN PATENT DOCUMENTS

| 58-38967 | 3/1983 | Japan. |
| 59-49148 | 3/1984 | Japan. |
| 59-49239 | 3/1984 | Japan. |

Primary Examiner—Clifford C. Shaw
Attorney, Agent, or Firm—Finnegan, Henderson, Farabow, Garrett, & Dunner

[57] ABSTRACT

An optical write head for an electrostatic dot-matrix image printing system which includes a plurality of controlled light emission element row-arrays positioned parallel and spaced in the direction perpendicular to the row-wise direction a distance equal to an integer multiple of the desired dot image-pitch S measured in the perpendicular direction, corrected by the fraction S/N where N is the number of row-arrays. A timed electrode drive circuit activates the arrays sequentially, and grid mask elements extending transversely across the row-arrays control emission from the individual light emission elements in an activated array, to minimize the number of drive circuit switching elements. A series-to-parallel signal conversion and storage circuit preprocesses the recording signal of the image to be printed.

3 Claims, 9 Drawing Sheets

OPTICAL WRITE HEAD

This application is a continuation, of application Ser. No. 897,829, filed Aug. 19, 1986, now abandoned.

BACKGROUND OF THE INVENTION

1. Field of the Invention

The present invention relates to an optical write head for forming an electrostatic latent image on a photosensitive material by light emission elements disposed in rows.

2. Description of the Prior Art

Figure 14:
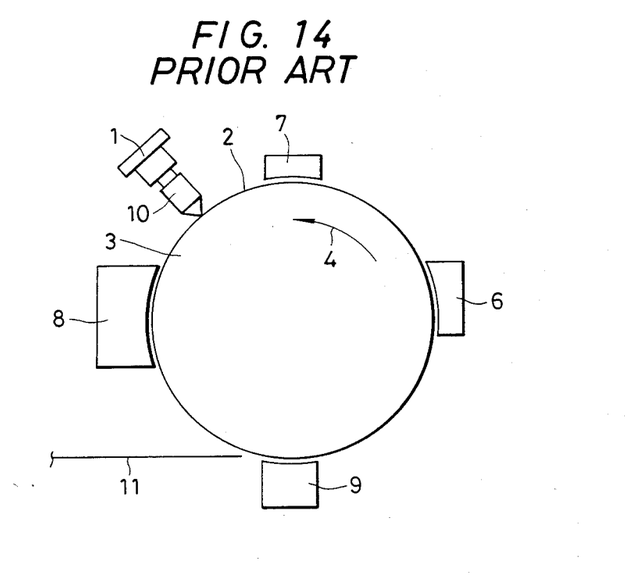
FIG. 14 is a transverse sectional view of a conventional electrostatic recording apparatus which is a suitable application for the present invention.

FIG. 14 is a side view of a conventional electrostatic recording apparatus which has an optical write head 1 having light emission elements disposed in rows, for forming an electrostatic latent image on a photosensitive material 2.

The photosensitive material 2 is formed in layers on the circumference of a photoconductive drum 3 which, in turn, is rotatably connected to a drive device (not shown) for rotation in the direction of arrow 4. Around the circumference of the photoconductive drum 3, there are disposed a cleaner 6 for cleaning the surface of the photosensitive material 2, a charging corotron 7 for electrostatically charging the photosensitive material 2, the optical write head 1 for forming an electrostatic latent image composed of a plurality of exposed "dots" on the photosensitive material 2, a convergent lens 10, a development unit 8 for applying toner to the formed electrostatic latent dot image, and a transfer corotron 9 for transferring the toner-developed image onto recording paper 11.

Figure 15:
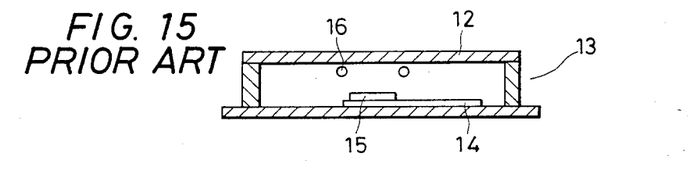
FIG. 15 is a transverse sectional view of a conventional optical write head.
Figure 16:
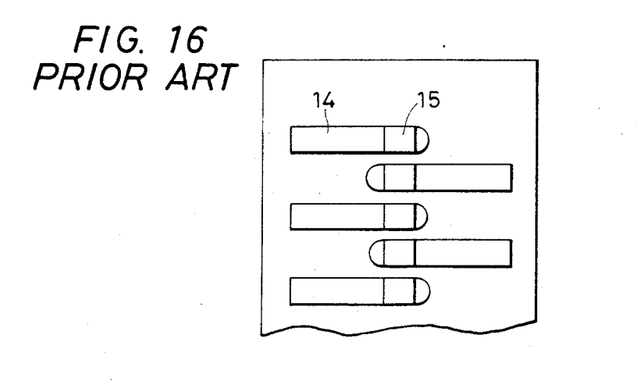

The construction of a conventional optical write head is shown in FIGS. 15 and 16. FIG. 15 is a transverse sectional view of the conventional optical write head, and FIG. 16 is a fragmentary plan view thereof.

In FIG. 15, anode patterns 14 are formed within an evacuated, closed case 13 having a transparent separator 12. The anode patterns 14 are coated with fluorescing material at the upper surfaces of one end portion thereof. The fluorescing material is hereinafter referred to as "light emission elements" 15. A filament-like cathode electrode 16 is provided just under the transparent separator 12.

Cathode electrode 16 is heated by an electric current flowing therein, causing the emission of thermal electrons. When the cathode electrode 16 is grounded and a positive voltage is impressed on the anode electrodes 14, the thermal electrons collide with the light emission elements 15, causing them to fluoresce. As shown in FIG. 16, the anode electrodes 14 are arranged parallel to each other and are spaced at equal intervals but in an alternating relationship.

The plurality of anode electrodes 14 are electrically insulated from one another. A circuit is provided for selectively impressing a predetermined positive voltage individually to each anode electrode to provide a predetermined pattern. The light emission elements 15 emit light corresponding to the desired dot pattern to thereby form an electrostatic latent image on the photosensitive material 2 shown in FIG. 14.

Optical write heads designed as described above have been described, for example, in Japanese Patent Application (KOKI) Nos. 38967/83, 49249/84, 46740/83, etc. (the term "KOKI" as used herein means an "unexamined published application").

Such conventional optical write heads, however, have the disadvantage that the light emission elements must be arranged at regular intervals because the light emission elements are aligned in rows. The intervals are necessary for securing electrical insulation material between the spaced anode electrodes. For this reason, non-emission electrode portions exist between the light emission elements, thereby precluding improvement in dot density, and therefore image quality, beyond that achievable with the thinest insulation layer.

Moreover, such conventional optical write heads have another disadvantage in requiring as many drive elements as the number of light emission elements and a circuit having the capacity for controlling the light emission elements independently of each other. This requirement prevents significant reductions in the total cost of the apparatus.

SUMMARY OF THE INVENTION

In view of the above-mentioned problems, an object of the present invention is to provide an optical write head which provides a further improvement in image quality.

Another object of the invention is to provide an optical write head having a simplified drive circuit to reduce the overall cost of the apparatus.

In accordance with the present invention, the optical write head for an electrostatic recorder comprising at least two rows of light emission element arrays each including a plurality of light emission elements, the row-arrays having center lines and being disposed with the center lines parallel to each other and spaced at predetermined intervals in the direction perpendicular to the row-wise direction, with the light emission elements on adjacent arrays staggered in row-wise position for disposing all of the light emission elements at equal row-wise direction intervals when viewed from a direction perpendicular to the arrays. Driving circuit means are provided for activating the light emission elements in respective arrays to emit light successively array by array at different times in the order from one array to the other to irradiate a photosensitive material for forming a latent image comprising a matrix of dots arranged regularly in the row-wise direction and in the direction perpendicular thereto. The distance between the respective center lines of the light emission element arrays is set on the basis of a reference value corrected with a correction factor, the reference value being an integer multiple of the pitch of the dots in the direction perpendicular to the row-wise direction, and the correction factor being defined as a distance of movement of the photosensitive material in the time interval between activation of adjacent arrays.

Preferably, the distance between the respective center lines is defined by subtracting the correction factor from the reference value when the photosensitive material moves in the direction from one light emission element array toward the other light emission element array which is arranged to emit light earlier in time than the one array, and by adding the correction value to the reference value when the photosensitive material moves in the direction from one light emission element array toward the other light emission element array which is arranged to emit light later in time than the one array.

It is also preferred that the center lines of said row-arrays are disposed at equal intervals, and that the distance between said center lines is defined so as to satisfy the equality $$P = (X \cdot N - 1) \cdot S/N$$

when the photosensitive material moves from the later-emitting array toward the earlier-emitting array and by the equality $$P = (X \cdot N + 1) \cdot S/N$$

when the photosensitive material moves from the earlier-emitting array toward the later-emitting array, wherein P represents said distance between said center lines, S represents the pitch of the printed dots in the direction perpendicular to the row-wise direction, X represents an integer, N represents the number of the light emission element arrays, and said reference value is defined to be X times the value S.

It is still further preferred that timing circuit means operatively connected to the driving circuit means are provided for timing activation of the light emission elements of adjacent row-arrays to occur a predetermined fraction of the time T apart, where T is the time between successive activation of the same array, and wherein the fraction is determined by dividing T by N where N is the total number of row-arrays, the correction factor being determined by dividing S by N, where S is the pitch of the dots in the direction perpendicular to the row-wise direction.

And it is also preferred that grid means are provided and positioned to mask the parallel positioned arrays, the grid means including a plurality of grid elements each extending transversely across the parallel positioned row-arrays; second driving circuit means operatively connected to said grid elements are provided for controlling emission from individual ones of said light emission elements in an activated row-array; and timing circuit means are provided to coordinate the driving circuit means and the second driving circuit means.

The operation of the optical write head according to the invention will now be described briefly. The optical write head forms an electrostatic latent image corresponding to the dots disposed at regular intervals in a first light emission element row-array, and then forms an electrostatic latent image corresponding to the dots of an adjacent light emission element row-array to fill the intervals in the first formed latent image on the photosensitive material. In the case where three or more rows are provided, the above-mentioned procedure is repeated successively.

The distance between the respective center lines of the light emission element arrays is set by correcting a reference value with a correction value. The reference value is an integer multiple of the pitch of the dots in a direction perpendicular to the arrays, and the correction value is the distance of movement of the photosensitive material corresponding to the interval in light emission timing between adjacent parallel arrays. Row-wise linearity of the dots printed by the separate light emission element arrays can be secured, and a high-quality image can be obtained in spite of the shift in the respective light emission timing of the adjacent light emission element arrays. As described above, printing of dots arranged regularly both row-wise and in the direction perpendicular thereto can consequently be performed.

BRIEF DESCRIPTION OF THE INVENTION

FIGS. 5 through 11 are further schematic views to help explain the setting of the distance between the respective center lines of row-arrays in the optical write head of the present invention;

FIG. 15 is a fragmentary plan view of the optical write head of FIG. 15.

DETAILED DESCRIPTION OF PREFERRED EMBODIMENTS

Description of the Optical Write Head

Figure 1:
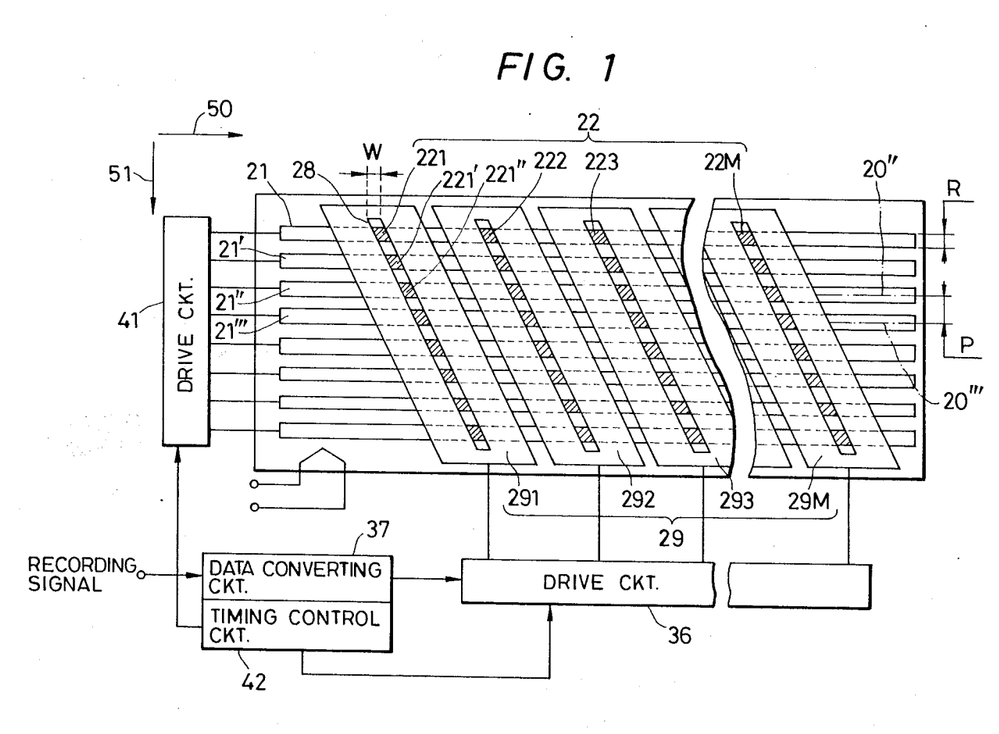
FIG. 1 is a block diagram of a presently preferred embodiment of the optical write head of the present invention.

FIG. 1 is a block diagram showing an embodiment of the optical write head according to the present invention.

In FIG. 1, eight anode electrodes 21, each extending in the row-wise direction of the optical write head (that is, in the direction of arrow 50), are disposed at equal spaced intervals in the direction perpendicular to the row-wise direction (arrow 51). A row of M light emission elements 221–22M, M being an integer, is provided and is represented by the shadowed portions on the anode electrodes 21. In this specification, a group of light emission elements 221–22M on each anode electrode 21 is referred to as "a light emission element array", the direction of the arrow 50 in the drawing is referred to as "the row-wise direction", and the direction of the arrow 51 is referred to as "the direction perpendicular to the row-wise direction".

The light emission elements in each array, such as elements 221–22M constituting the respective light emission element array 22, are disposed at equal intervals in the row-wise direction. However, the starting position of the initial element in successive rows in the 51 direction is staggered or "off-set" in the row-wise direction by an amount equal to the desired row-wise distance between dots in the image to be formed on photosensitive material 2.

When viewed in the direction 51 perpendicular to the row-wise direction, all of the elements in all of the rows appear to be disposed at equal distances in the row-wise direction. For example, when viewed in the 51 direction emission element 221 would appear to be adjacent element 221′ which would appear adjacent element 221″, etc., wherein the row-wise distance between adjacent elements would be the desired distance. In the case where the width W of the respective light emission element measured in the row-wise direction is selected to be equal to or greater than the above-mentioned distance as is depicted in FIG. 1, the elements can be arranged as if no gaps exist between the mutually adjacent elements when viewed from the direction 51 perpendicular to the row-wise direction.

In a preferred embodiment, the size R of the light emission element, taken in the direction perpendicular to the row-wise direction, can be selected to be, for example, 1/12 mm; the distance P between the respective center lines 20″, 20‴ of the light emission element arrays 22″, 22‴ extending parallel to the row-wise direction 50 can be selected to be 17/96 mm; and the width W of the respective light emission element, taken in the row-wise direction can be selected to be 1/12 mm. With respect to one light emission array 22 in this preferred embodiment, the distance between the mutually adjacent light emission elements on the same array, e.g., the distance between the light emission elements 221 and 222, can be selected to be 8/12 mm, and the sides of the respective light emission element are inclined at an angle of 64.5 degrees with respect to the row-wise direction 50 corresponding to the stagger or off-set between initial elements of adjacent arrays.

The selection of the distance P is particularly important for the present invention, and the operational principle that determines the selection of distance P will be described later in more detail.

Figure 2:
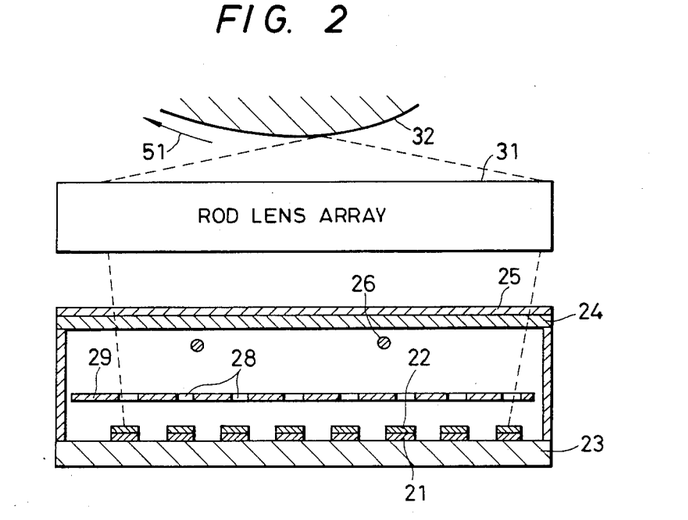
FIG. 2 is a transverse sectional view of the optical write head depicted in FIG. 1.

A transverse sectional view of the optical write head in the present embodiment is shown in FIG. 2. A transparent separator 24 coated with an anti-reflection film 25 is provided on the upper surface of a closed case 23. Two filament-like cathode electrodes 26, eight light emission element arrays 22 of fluorescent material provided on anode electrodes 21, and a grid 29 having slits 28 at the center thereof (see also FIG. 1), and provided above the arrays 22, are installed in the closed case 23. It is apparent from FIG. 1 that the light emission elements 221-22M can be seen through the slits 28 of the grid 29. The elements of the grid 29 are as many as the light emission elements of one array 22, that is, M in number (M being an integer). While the drawing shows the case where the grid 29 is constituted by four elements, the number of the elements of the grid 29 may be suitably selected on occasion, for example, 384 elements across the width of B4 size paper (257 mm).

Light emitted from the light emission element array 22 is focused, through the transparent separator 24, on a photosensitive material 32 by a rod lens array 31, and forms an image thereon. The optical system used in this embodiment is an "equal magnification" type known in the art. Accordingly, an electrostatic latent image of equal size to the respective light emission elements constituting the light emission element array 22 is formed on the photosensitive material 32 as long as the photosensitive material 32 is stationary. The size of each dot printed through development and transferring of the latent image would, of course, also be equal to that of an emission element for such a stationary image. In fact, however, the photosensitive material 32 moves in the direction of the arrow 51 during the light emission of the light emission element array 22. Accordingly, the size of printed dots becomes slightly elongated in the direction of the arrow 51.

Reverting to FIG. 1, a circuit for driving the optical write head will be described hereinafter. A drive circuit 36 for grid 29 is electrically connected to the elements 291-29M of the grid 29. When picture signals applied to the drive circuit 36 from a data converter 37 have the contents corresponding to the printing of white dots, a potential is applied to the corresponding grid elements of grid 29 (the grid elements hereinafter referred to as having been "turned on" in such a condition). In this case, the light emission elements disposed on the voltage-impressed anode electrodes 21 emit light so that the photosensitive material 32 (FIG. 2) is partially electrically discharged. Accordingly, toner will not adhere to the thus discharged portions of the photosensitive material.

Conversely, when the opposite potential is applied to the grid elements of grid 29 (i.e., the grid elements are "turned off"), all of the light emission elements just under the grid elements are extinguished so that the corresponding portions of the photosensitive material 32 (FIG. 2) are not electrically discharged. Accordingly, toner adheres to the non-discharged portions on the photosensitive material 32 during the development stage, and the printing of black dots results.

In short, control of the optical write head relative to the printing of white dots or black dots is effected by controlling the state (i.e., "turned on" or "turned off") of the grid elements of grid 29 by an appropriate print signal. Such a signal might, for example, be a digital pulse train where the individual pulses would constitute an individual signal or "decision" to print a white dot and the absence of a pulse in the train a "decision" to print a black dot. Upon receipt of the print signal, the optical write head of the presently preferred embodiment operates to determine the print timing of the light emission element array by successively turning on and then off the anode electrodes 21, 21′, 21″, etc. by drive circuit 41.

Drive circuits 36 and 41 are provided for performing such control as described above. Drive circuit 36 converts the picture signals from a serial sequence to a parallel format corresponding to the number of row-arrays, latches the converted signals for a necessary time, and then supplies the converted signals to the grid 29 for controlling the formation of the composite latent image.

Drive circuit 36 can comprise, for example, shift resistors or the like and can be arranged to store in parallel serially inputted picture signals by regular amounts at given timings. Accordingly, a number of individual picture signals equal to the elements of the grid 29 (that is, M picture signals in this embodiment) are stored. When the picture signals corresponding to dots of one row to be printed are D1, D2, D3, D4, D5 . . . , picture signals D1, D9, D17, D25 . . . are latched at intervals of eight signals apart after serial-to-parallel conversion in the first timing. In the second timing, pictures signals D2, D10, D18, D26, etc. are latched. This procedure is repeated a total of eight times in the disclosed embodiment to thus complete signal processing for one line of the composite photo image. This operation will be described later in more detail. The operation for the selection of the picture signals is performed on the basis of clock signals of a timing control circuit 42.

The other drive circuit 41 comprises a scanning circuit for exclusively and successively scanning eight anode electrodes with matching timing with the signals of the grid electrodes by the timing control circuit 42. The recording (picture) signals are inputted to data conversion circuit 37 from a recording signal source (not shown). The data converting circuit 37, which is op eratively connected to the timing control circuit 42, transmits the serial sequence picture to the drive circuit 36 at a predetermined rate.

Description of the Circuit Operation

Figure 3:
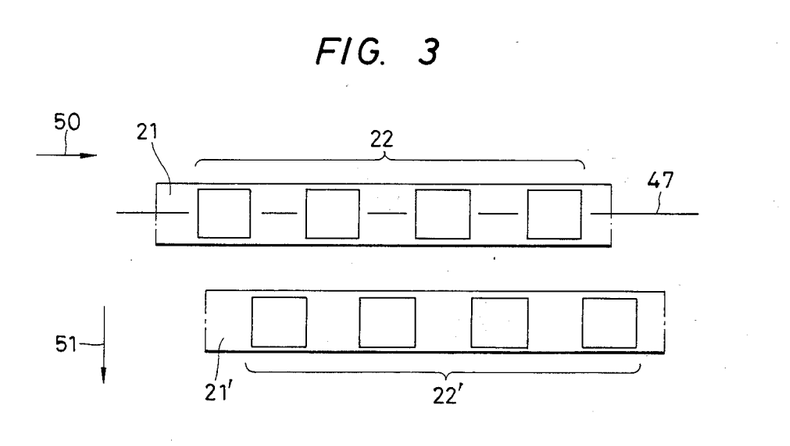
FIG. 3 is an enlarged view of important parts of the head shown in FIG. 1 to help explain the principle thereof.

FIG. 3 is an enlarged view of important parts of the optical write head to help explain the principle of the present invention. To simplify the description, the drawing shows the case where only two row-arrays of light emission element arrays are provided, and shows no grid electrodes and no drive circuits. Specifically, there are provided two anode electrodes 21 and 21' parallel to each other. Light emission element arrays 22 and 22' are provided on the anode electrodes, respectively.

If the two light emission element arrays arranged parallel to each other are viewed in the direction perpendicular to the row-wise direction (that is, when viewed in the direction of the arrow 51), all the light emission elements of the two arrays are seen as if they are arranged at equal intervals. First the upper light emission element array 22 emits light to thereby form part of one line, namely line 47, of an electrostatic latent image to be formed on the photosensitive material facing thereto. Then the photosensitive material is moved in the direction of the arrow 51 relatively to the light emission element arrays so that the line 47 of the image comes into registration with the lower light emission element array 22'. Thereafter, the remaining part of line 47 of the electrostatic latent image is formed by the lower light emission element array 22'.

Accordingly, the resulting electrostatic latent image of picture line 47 is the same as if the line image were formed by all the light emission elements 22, 22' arranged in a single row. The two light emission element arrays are caused to emit light alternately repeatedly with a predetermined condition, so that dots arranged regularly lengthwise and widthwise can be printed completely.

Formation of the Electrostatic Latent Image

Figure 4A:
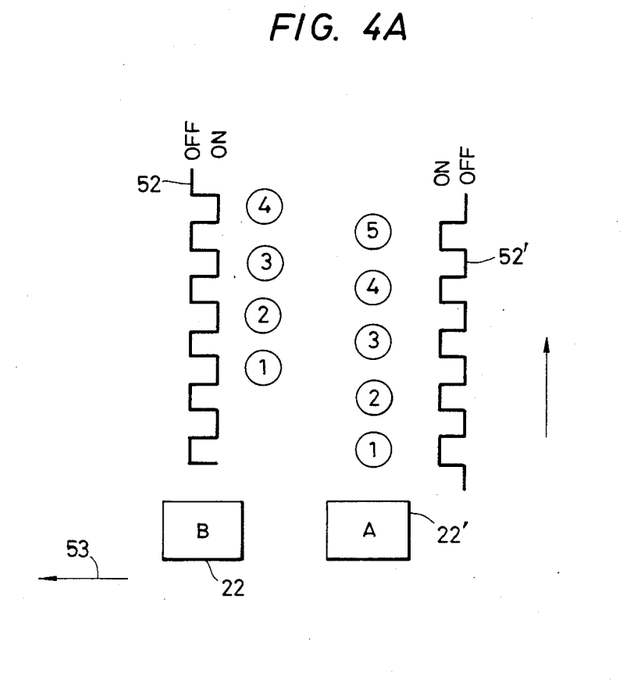
FIGS. 4A and 4B are, respectively, a schematic of another embodiment of the present invention, and timing charts to help explain the operation thereof.
Figure 4B:
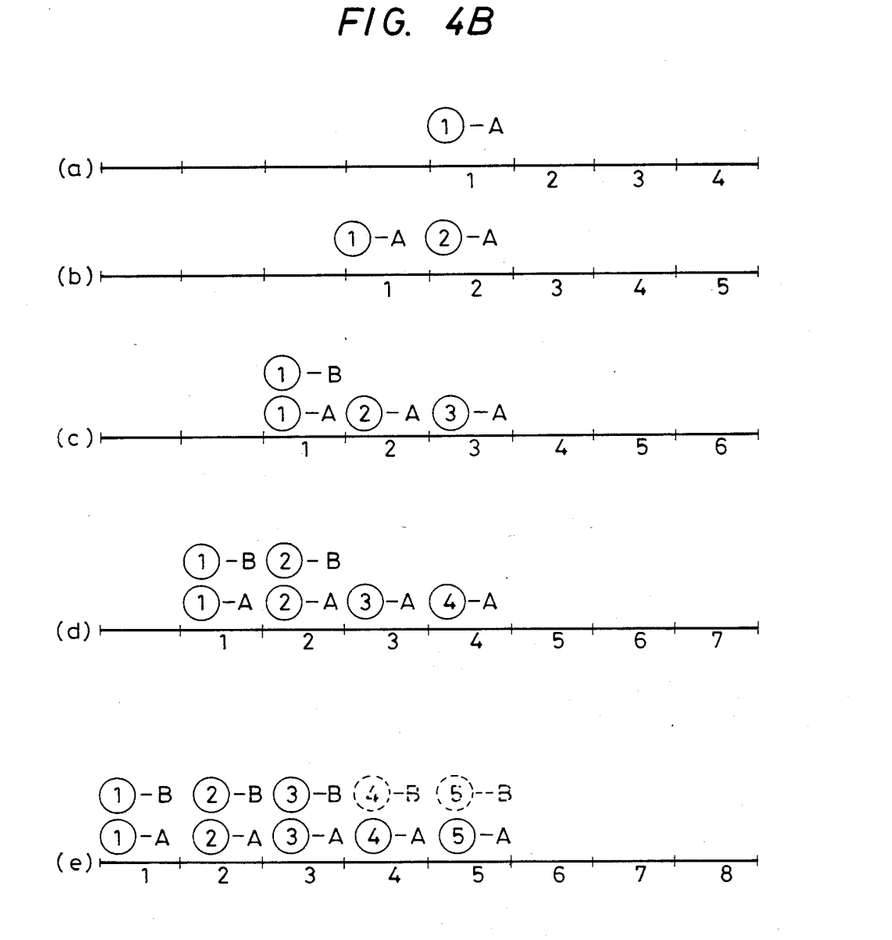

FIGS. 4A and 4B are schematics illustrating the principle of the operation for forming an electrostatic latent image by the optical write head of the present invention.

In FIG. 4A, blocks A and B designate the light emission elements of the right array 22' and the light emission elements of the left array 22 respectively when the head depicted in the FIG. 3 schematic is viewed in the direction of the arrow 50. Although this embodiment shows the case where the photosensitive material moves in the direction of the arrow 53 of FIG. 4A, the present invention can be applied to the case where the photosensitive material is maintained stationary but the light emission element arrays are moved.

In FIG. 4A, the respective timings of the input signals to the light emission elements in the blocks A and B are illustrated directly above the light emission elements in the blocks A and B respectively with a time axis taken vertically. It is assumed that the light emission elements emit light for a very short time and that there is no relative movement of the photosensitive material during the interval of light emission by the light emission elements.

Reference numerals 52 and 52' designate timing voltage pulses to be impressed on the anode electrodes to activate the respective light emission elements A and B. In FIG. 4A, "ON" and "OFF" means the turning-on/off of the anode electrodes, and 1–5 represents individual dot picture signals of a first row, a second row, . . . , and a fifth row, respectively. In the drawing, the light emission element blocks A and B emit light alternately five times, respectively. Consequently, the electrostatic image of five rows can be formed as a whole.

In FIG. 4B, the time charts (a)–(e) designate the contents of the electrostatic latent image formed on the photosensitive material just after the light emission by the light emission elements has been performed row by row successively. For example, 1-A expresses the fact that the electrostatic latent image of the first row has been formed by the light emission elements in the block A. When the light emission by the light emission elements in both the blocks A and B has been completed on the same line in the overlapping manner successively, the electrostatic latent image of one dot line is continuously formed with no gaps since the elements in each of the blocks A and B are equidistantly arranged at a predetermined gap which is equal to one picture element width and the respective blocks A and B are relatively shifted to each other in the row-wise direction (that is, into the paper of the drawing).

The sequence of operation to achieve the dot image in FIG. 4B will now be described in detail. First, the anode electrodes 21 (FIG. 3) of the light emission element array A are turned on. In this case, the grid elements or electrodes 29 disposed above the light emission elements (not shown in FIG. 4A) to be caused to emit light have been turned on or off in advance in accordance with the picture signals. Thus, the electrostatic latent image of the row 1 is formed on the photosensitive material by the light emission array A as seen in FIG. 4B at time chart (a).

Next, the anode electrodes 21 of the light emission element array A are turned on again, and the grid electrodes 29 are turned on or off in accordance with the picture signals of the row 2. At that time, the photosensitive material has been relatively moved in the direction of the arrow 53 by the distance of one row. Thus, the electrostatic latent image of the row 2 is formed by the light emission element array A as seen in time chart (b) of FIG. 4B.

Then, the photosensitive material is moved again relative to the head in the direction of the arrow 53 by the distance of one row, and thereafter the light emission element array B forms an electrostatic latent image in accordance with the picture signals of the row 1. At that time, the electrostatic latent image shown as 1-A has come just under the light emission element array B. Thus, the electrostatic latent image of the row 1 is completed as seen in time chart (c) of FIG. 4B.

At the next timing, the electrostatic latent image of the row 3 is formed by the light emission element array A before the photosensitive material has been moved as in time chart (c) of FIG. 4B. The photosensitive material is again indexed by a row separation amount to complete the formation of the electrostatic latent image by the light emission element array B in the manner as described above and as depicted in time chart (d) of FIG. 4B. Such procedures are repeated to perform the formation of the electrostatic latent image of five rows successively through the state as seen in time chart (e) of FIG. 4B.

According to the above-mentioned procedures, the optical write head of the present invention can achieve the same result as in the theoretical case where the electrostatic latent image is formed by light emission elements arranged in a single row substantially without any gaps. Further, the number of switching transistors installed in the anode electrode drive circuit is reduced by 1/M, where M is the number of light emission elements of one row-array.

Selection of Distance Between Light Emission Element Arrays

Figure 5:
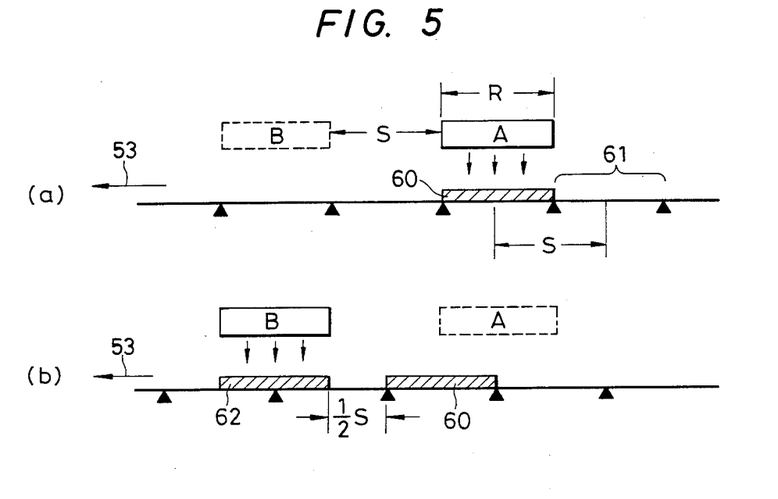

In the case where two rows of light emission element arrays are arranged to alternately emit light on the basis of the above-mentioned principle, the photosensitive material is relatively moved at an equal speed even during a period of from the time when the light emission by one light emission element array has been completed to the time when the light emission by the other light emission element array is performed, resulting in a phenomenon as shown in FIG. 5. It is assumed that the light emission elements emit light during a very short time and there is no relative movement of the photosensitive material during the light emission by the light emission elements.

FIG. 5 shows the case where the direction 53 of the movement of the photosensitive material is the same as the direction from the light emission element array A toward the light emission element array B which is caused to emit light later in time than the array A. In this embodiment, the size of each light emission element in the direction perpendicular to the row-wise direction of the light emission element arrays A and B is represented by R, and desired "dot pitch" perpendicular to the row-wise direction, namely, the distance between successive lines of dots in the completed image, is represented by S. For convenience, it is considered that $S=R$ in this embodiment and that arrays A and B are separated by a gap equal to the pitch S. Also, it is assumed that the light emission elements on array B are shifted in the row-wise direction (into the paper in FIG. 5) relative to the elements array A.

Figure 6:
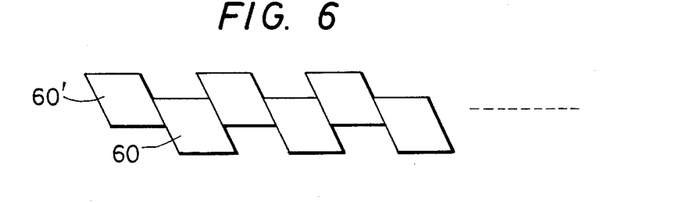
FIG. 6 is a schematic view of another embodiment of the optical write head of the invention showing the arrangement of the light emission elements.

The light emission element array A is arranged to periodically emit light so as to form the sequentially next electrostatic latent image on area 61 after the passage of time T from the formation of the electrostatic latent image 60, as shown in time chart (a) of FIG. 5. Since in the present invention the light emission element array B shown in FIG. 3 is controlled by the same simplified circuitry used to control array A and consequently cannot emit light simultaneously with the light emission element array A, the array B must be set to emit light after the passage of some fraction of the time interval T, for instance T/2, after the light emission by the array A. In this arrangement, however, a gap of S/2 arises between the electrostatic latent image 62 formed by the array B and the row-wise adjacent electrostatic latent image 60 previously formed by the array A. With such timing, the individual electrostatic latent dot images that should be formed on the same line with the passage of time T are shifted from each other by the distance of S/2. That is, the thus formed electrostatic latent dot images are arranged like sawteeth or staggered in the row-wise direction as shown in FIG. 6. In FIG. 6, the electrostatic latent image 60 is formed by the individual light emission elements in the block A, and the electrostatic latent image 60' is formed by the individual light emission elements in the block B.

Figure 7:
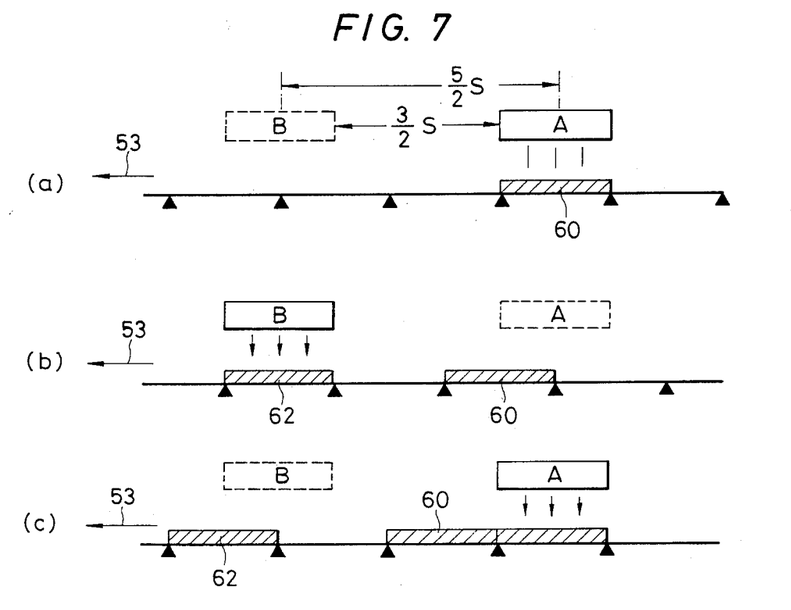
Figure 8:
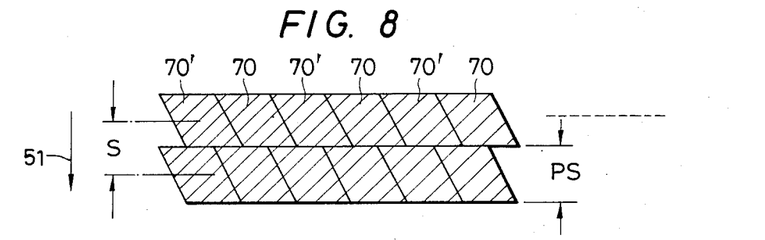

To compensate for this phenomenon, as shown in FIG. 7, the distance between the light emission element arrays A and B of the FIG. 5 embodiment is selected to be 1.5 times of S (that is, 3S/2). As a direct result of such a selection, and as shown in time chart (a) of FIG. 7, in the case where the light emission element array A emits light to thereby form an electrostatic latent image 60 and then the light emission element array B later emits light to thereby form an electrostatic latent image 62, the distance between the electrostatic latent images 60 and 62 is an integer multiple of S, namely, 2S in the present case. Thus, and as shown in FIG. 8, after development, adjacent dots can be aligned on the same line without any stagger or sawtooth profile.

Figure 9:
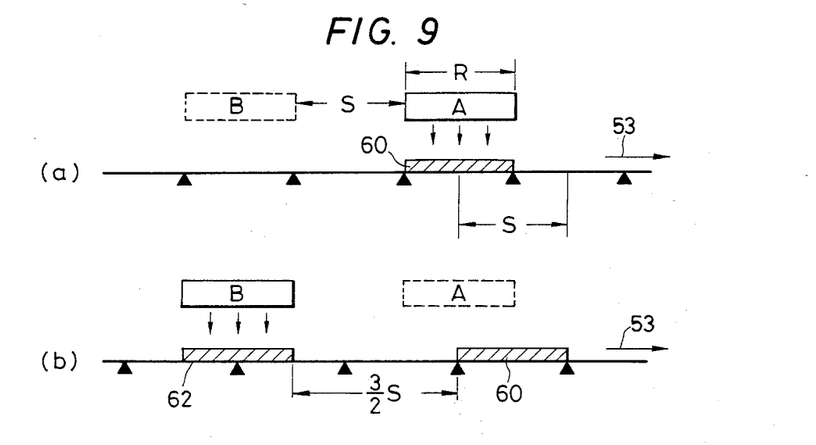

FIG. 9 shows the case where the direction 53 of the movement of the photosensitive material is reversed so that the photosensitive material moves in the direction from the light emission element array A towards the delayed-action light emission element array B which has emitted light earlier than the array A. In this case, the timing of the picture signals to be supplied to the light emission element arrays A and B, of course, must be reversed to that in the case of FIG. 4A.

Figure 10:
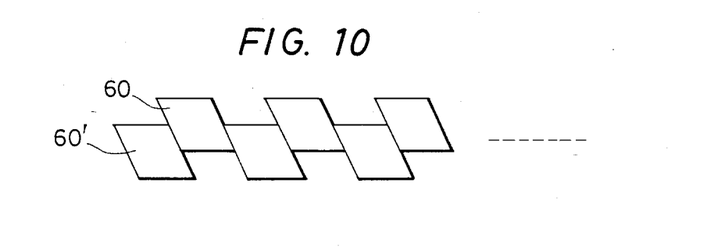
Figure 11:
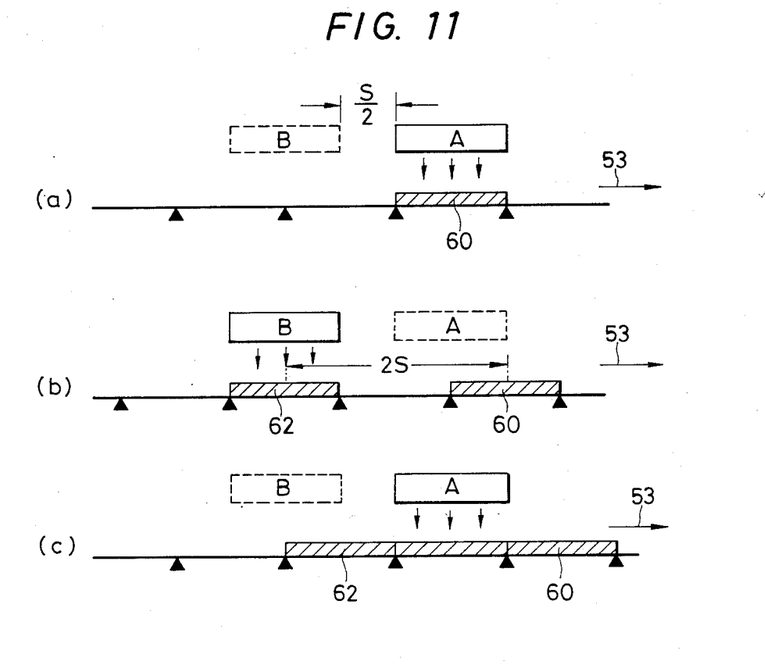

In FIG. 9, it is again assumed for the purpose of illustration that the distance between the arrays A and B is also selected to be S. In this case, the following phenomenon arises. As shown in time chart (b) of FIG. 8, a gap of 3S/2 arises between the electrostatic latent image 60 formed by the array A and the electrostatic latent image 62 formed by the array B. The position of the electrostatic latent image 60 formed by one light emission element array and the position of the electrostatic latent image 60' formed by another light emission element array to be arranged on line are shifted from one another. In this case, as shown in FIG. 10, the row-wise adjacent electrostatic latent images 60 and 60' are shifted from each other in the reverse direction from the case of FIG. 6. To compensate for this phenomenon, and as shown in FIG. 11, the gap between the light emission element arrays A and B is selected to be S/2. As a result of such a selection, and as shown in time chart (a) of FIG. 11, in the case where the light emission element array A emits light to thereby form an electrostatic latent image 60 and then the light emission element array B emits light to thereby form an electrostatic latent image 62, the distance between the electrostatic latent images 60 and 62 is 2S. Thus, as shown in FIG. 8, dots 70 and 70' after development can be aligned on the same line without any stagger or sawtooth profile.

In fact, the light emission time by the light emission elements is finite and the photosensitive material moves even during the light emission by the light emission elements. Accordingly, there occurs a difference in shape between the light emission elements and the printed dots. That is, the printed dots are elongated compared to the size of the light emission elements in the direction perpendicular to the row-wise direction. Accordingly, the correction value for the positional shift should be determined in accordance with the dot size. If the number of the light emission element row-arrays is increased, the number of grid elements of grid 29 shown in FIG. 1 and the number of field-effect transistors for drivingly controlling the grid elements can be reduced where S is the desired dot pitch in the perpendicular direction and N is the number of row-arrays.

Further Specific Embodiment

Figure 12:
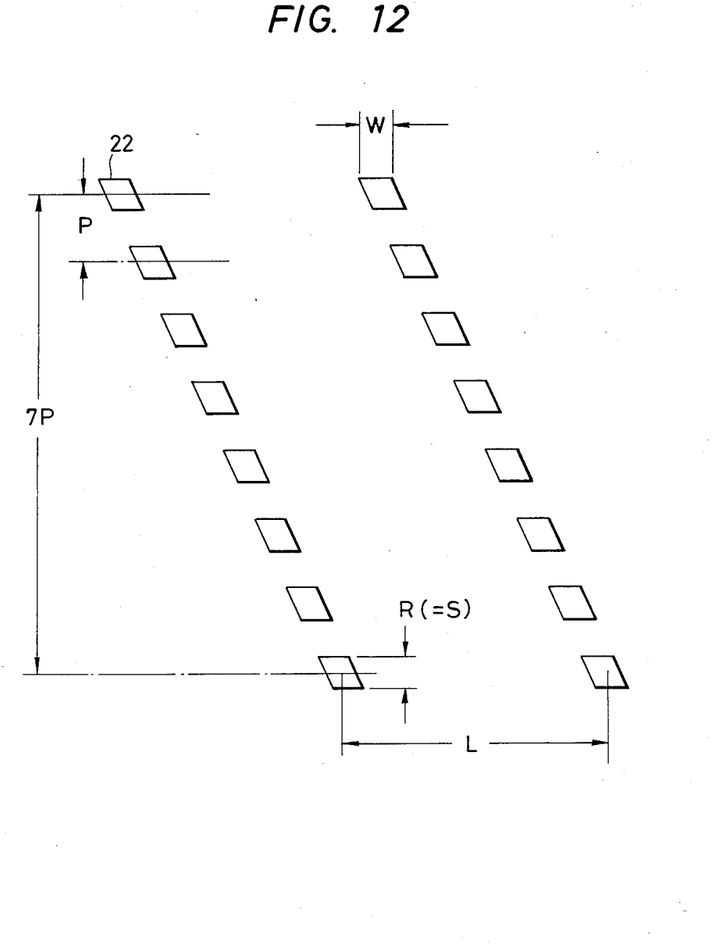

FIG. 12 shows an example of a practical arrangement of the light emission elements in the case where eight rows of light emission element arrays are provided.

Each of the row-wise width W of the respective light emission element 22 and the pitch size R of respective elements 22 in the direction perpendicular to the row-wise direction is selected to be 0.085 mm. Also, the pitch L between adjacent light emission elements in a respective row is selected to be 0.68 mm, and the distance P between the respective center lines of the light emission element arrays is selected to be about 0.18 mm.

In this case, the distance P between the center lines of the light emission element arrays was chosen by adding one-eighth of the dot pitch S to a reference value equal to twice the dot pitch S (S being equal to the size R of the light emission element in this embodiment). In a more general case using the 2S reference value, the distance P can be found by the formula $P=(2N+1)\cdot S/N$. The "plus" sign in the above formula corresponds to the case described in FIG. 7 (where the direction of relative motion between the photosensitive material and the arrays is from the later-activated arrays toward the earlier-activated arrays. The "minus" sign corresponds to the reverse case, as depicted in FIG. 9. The distance between the center lines for the reverse case in the FIG. 12 embodiment is obtained by subtracting one-eighth of the dot pitch S from a reference value of twice the dot pitch S, in this case yielding a distance P of 0.16 mm.

In the embodiment of FIG. 12 as well as in that of FIG. 1, the dots obtained by development after the formation of electrostatic latent image on the photosensitive material by the light emission elements, are arranged without any gaps and without any overlapping. However, slight gaps between the dots or regular overlaps of the dots in the boundaries thereof are acceptable. Generally, the distance between the light emission element arrays can be larger if the movement between photosensitive material and the arrays is controlled to a high accuracy.

In the present invention, a reference value is obtained by an integer multiple of the pitch of the dots in the direction perpendicular to the row-wise direction. The dot pitch herein means the distance S between the center lines of the dots in mutually adjacent rows as shown in FIG. 8. If the dot image size PS is longer than the distance S, the dots overlap in the boundary therebetween, and, reversely, if the dot image size PS is shorter than the distance S, gaps arise between the dot boundaries.

Figure 13:
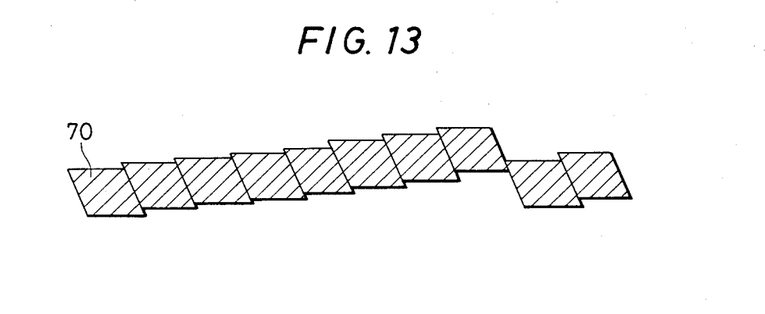
FIG. 13 is a schematic of the dot image produced by the embodiment of FIG. 12 when the center lines of the light emission element arrays are not corrected.

The correction value is equivalent to the distance of movement of the photosensitive material during the delay in light emission owing to the interval in time of light emission between adjacent light emission element arrays. In the embodiment of FIG. 12, the photosensitive material moves by S/8 during the period of from the light emission of one light emission element array to the light emission of the adjacent light emission element array. The value of S/8 can thus be thought of as a correction factor to be applied to a reference array separation value (in this case 2S) to achieve registration of adjacent dots. The arrangement of the dots 70 without the correction is shown in FIG. 13. According to the optical write head of FIG. 12, the row-wise linearity of the light emission elements can be improved, thereby providing higher quality image processing.

The light emission elements are of the same size, and the dots printed by those light emission elements are arranged with a pitch of S. When the light emission element arrays are set to be at equal intervals, the distance between the center lines of the light emission element arrays can be represented by the general equality where X represents an integer of magnification with respect to the dot pitch to define a reference value, and N represents the number of the light emission element arrays. Again, the "plus" represents the relative movement scheme depicted in FIG. 7 while the "minus" sign repesents the FIG. 9 reverse case.

As well as in the case where the correction value is added to the reference value to thereby select the distance between the light emission element arrays, in the case where the correction value is subtracted from the reference value to thereby select the distance between the light emission element arrays, the operation of the optical write head is not changed although the physical size and ease of construction thereof may be different. In the former case, the size of the optical write head becomes large but manufacturing is simplified. In the latter case, on the other hand, wiring-pattern density becomes so high that high accuracy is required in manufacturing, but the head can be miniaturized. Accordingly, either of those cases can be selected in accordance with the contemplated end use.

While the illustrated embodiment represents the preferred form of the present invention, it is to be understood that various changes in the operation, form, size and minor details of construction may be resorted to without departing from the spirit of the invention. For example, the number of the light emission elements and the distance therebetween may be a desired changed. The light emission time and size of the light emission elements may be changed to adjust the size of dots. The use of a lot of light emission element arrays as shown in FIG. 1 causes shortening the emission time thereof, thereby suppressing the elongation of the dot size.

When common anode electrodes as described in the embodiments are used for the light emission elements and time sharing occurs between the respective arrays, the temperature rise in the fluorescent material may be lowered. Accordingly, the voltage impressed to the anode electrodes can be increased to provide a corresponding increase in the instantaneous brightness of the light emitted by the elements.

Light emission diode (LED) arrays or optical write elements using liquid crystal shutters may be used in the present invention, and the present invention is not limited to the above-mentioned embodiments but only by the appended claims and their equivalents. For example, although the embodiments show the case that two rows of light emission element arrays are provided, three or more rows of light emission element arrays can be provided with the same effect, as is suggested by FIGS. 1 and 12.

According to the present invention, it is also possible to reduce non-emission portions between the light emission elements, thereby improving picture quality and resolution. Further, it is possible to reduce the number of drive elements by the use of common mode electrodes. In addition, it is possible to perform high-quality picture processing because the distance between the light emission element arrays can be selected to a suitable value to reduce or eliminate gaps or overlaps between individual dot images.

What is claimed is:

1. An optical write head for an electrostatic recorder adapted to form a latent image on photosensitive material moving relative thereto, the head comprising:

at least first and second adjacent rows of light emission element arrays each including a plurality of light emission elements, said row-arrays having center lines and being disposed with said center lines parallel o each other and spaced at predetermined intervals in the direction perpendicular to the row-wise direction, the light emission elements on adjacent arrays being staggered in row-wise position for disposing all of the light emission elements at equal row-wise direction intervals when viewed from a direction perpendicular to the arrays;

dynamic driving circuit means for activating the rows of light emission elements at different times to emit light successively array by array in the order from said first array to said second array to irradiate the photosensitive material for forming a latent image comprised of a matrix of dots arranged regularly in the row-wise direction and in the direction perpendicular thereto, a latent image of one line comprised of dots arranged in a direction perpendicular to the row-wise direction being formed on the photosensitive material once each of the rows of light emission elements emits light, and said predetermined intervals between the respective center lines of the light emission element arrays being determined from the following relationship:

$$P = (X \cdot N + 1) \cdot S / N$$

wherein P represents said predetermined intervals between said center lines, S represents the pitch of the printed dots in the direction perpendicular to the row-wise direction, X represents an integer, and N represents the number of the light emission elements arrays, and wherein the minus sign is used when said photosensitive material moves said selected distance in the direction from the first light emission element array toward the second light emission element array, and said driving circuit means is operative to activate said second array to emit light earlier in time than said first array, and the plus sign is used when said photosensitive material moves said selected distance in the direction from the first light emission element array toward the second light emission element array, and said driving circuit means is operative to activate said second array to emit light later in time than said first array.

2. The optical write head according to claim 1 further including timing circuit means operatively connected to said driving circuit means for timing activation of said light emission elements of adjacent row-arrays to occur a predetermined fraction of the time T apart, where T is the time between successive activation of the same array, and wherein the fraction is determined by dividing T by N where N is the total number of row-arrays.

3. The optical write head according to claim 1 further including grid means positioned to mask said first and second parallel positioned arrays, said grid means including a plurality of grid elements each extending transversely across said first and second parallel positioned row-arrays; second driving circuit means operatively connected to said grid elements for controlling emission from individual ones of said light emission elements in an activated row-array; and timing circuit means for coordinating said driving circuit means and said second driving circuit means.

* * * * *